United States Patent
Chen et al.

(10) Patent No.: US 11,889,354 B2
(45) Date of Patent: Jan. 30, 2024

(54) METHOD FOR LOAD IMBALANCE OPTIMIZATION UNDER SAME NETWORK COVERAGE, APPARATUS, DEVICE, AND STORAGE MEDIUM

(71) Applicant: NANJING HOWSO TECHNOLOGY CO., LTD., Jiangsu (CN)

(72) Inventors: Dalong Chen, Nanjing (CN); Yongzhang Huo, Nanjing (CN); Jibin Wang, Nanjing (CN); Wei Meng, Nanjing (CN)

(73) Assignee: NANJING HOWSO TECHNOLOGY CO., LTD., Jiangsu (CN)

( * ) Notice: Subject to any disclaimer, the term of this patent is extended or adjusted under 35 U.S.C. 154(b) by 70 days.

(21) Appl. No.: 17/761,114

(22) PCT Filed: Nov. 25, 2020

(86) PCT No.: PCT/CN2020/131431
§ 371 (c)(1),
(2) Date: Mar. 16, 2022

(87) PCT Pub. No.: WO2021/104298
PCT Pub. Date: Jun. 3, 2021

(65) Prior Publication Data
US 2022/0338061 A1 Oct. 20, 2022

(30) Foreign Application Priority Data
Nov. 26, 2019 (CN) .......................... 201911174102.4

(51) Int. Cl.
*H04W 28/20* (2009.01)
*H04W 28/08* (2023.01)
(Continued)

(52) U.S. Cl.
CPC ......... *H04W 28/0942* (2020.05); *H04L 43/16* (2013.01); *H04W 28/20* (2013.01); *H04W 36/0083* (2013.01)

(58) Field of Classification Search
CPC ............ H04W 28/0942; H04W 28/20; H04W 36/0083; H04W 36/00837; H04W 36/22; H04W 16/18; H04W 24/02; H04L 43/16
See application file for complete search history.

(56) References Cited

U.S. PATENT DOCUMENTS 8,270,975 B2 *  9/2012  Kim ..................... H04W 36/22
                                                    455/445
2009/0163223 A1 *  6/2009  Casey .................. H04W 36/22
                                                    455/453
(Continued)

FOREIGN PATENT DOCUMENTS

CN         104469848 A         3/2015
CN         104735705 A         6/2015
(Continued)

OTHER PUBLICATIONS

Lin Zhang, Yu Liu, Mengru Zhang, Shucong Jia and Xiaoyu Duan, "A Two-Layer Mobility Load Balancing in LTE self-organization networks," 2011 IEEE 13th International Conference on Communication Technology, Jinan, 2011, pp. 925-929. (Year: 2011).*
(Continued)

*Primary Examiner* — Yuwen Pan
*Assistant Examiner* — Swati Jain
(74) *Attorney, Agent, or Firm* — Harness, Dickey & Pierce, P.L.C.

(57) ABSTRACT

A method, device, and apparatus for optimizing unbalanced loads covered by a same network and a storage medium are provided. The method includes: determining whether loads of cells covered by a same network are balanced; determining, if the loads of the cells are unbalanced, a cell with a
(Continued)

highest network load rate and a cell with a lowest network load rate in the cells; determining a target offset parameter corresponding to a predetermined index according to a timing advance and the number of sampling points of each of the cell with the highest network load rate and the cell with the lowest network load rate; and adjusting a load of the cell with the highest network load rate and a load of the cell with the lowest network load rate based on the target offset parameter.

8 Claims, 3 Drawing Sheets

(51) Int. Cl.
*H04L 43/16* (2022.01)
*H04W 36/00* (2009.01)

(56) References Cited

U.S. PATENT DOCUMENTS

| | | | | |
|---|---|---|---|---|
| 2010/0184434 A1* | 7/2010 | Jeong | ............... | H04W 36/00837 455/435.2 |
| 2010/0323698 A1* | 12/2010 | Rune | .................... | H04W 48/20 455/436 |
| 2011/0053597 A1* | 3/2011 | Lee | ..................... | H04W 36/22 455/436 |
| 2011/0176424 A1* | 7/2011 | Yang | .................... | H04L 41/082 370/235 |
| 2013/0084872 A1* | 4/2013 | Suga | .................... | H04W 48/20 455/437 |
| 2013/0127474 A1* | 5/2013 | Zhang | .............. | G01R 19/16542 324/433 |
| 2014/0378144 A1* | 12/2014 | Legg | ................. | H04W 36/0058 455/437 |
| 2015/0141013 A1* | 5/2015 | Cui | ....................... | H04W 48/20 455/436 |
| 2015/0327198 A1* | 11/2015 | Axmon | ............. | H04W 56/0045 370/336 |
| 2015/0365953 A1* | 12/2015 | Papadopoulos | ........ | H04B 7/024 370/329 |
| 2016/0006659 A1 | 1/2016 | Kim et al. | | |
| 2016/0192238 A1* | 6/2016 | Papadopoulos | ....... | H04W 48/06 370/235 |
| 2016/0302106 A1* | 10/2016 | Lei | .................... | H04W 28/0226 |
| 2018/0006862 A1* | 1/2018 | Han | ..................... | H04B 7/0632 |
| 2022/0173792 A1* | 6/2022 | Makki | .................. | H04L 1/1812 |
| 2022/0256358 A1* | 8/2022 | Tosyali | ................. | H04W 16/28 |

FOREIGN PATENT DOCUMENTS

| | | | | |
|---|---|---|---|---|
| CN | 107371178 A | | 11/2017 | |
| CN | 109151881 A | | 1/2019 | |
| CN | 109219060 A | | 1/2019 | |
| CN | 109996244 A | | 7/2019 | |
| CN | 110876167 A | * | 3/2020 | ........ H04W 36/0083 |
| CN | 110913401 A | | 3/2020 | |
| CN | 111263403 A | * | 6/2020 | ............ H04W 28/08 |
| CN | 112020098 A | * | 12/2020 | ............ H04W 28/08 |
| WO | 2009149600 A1 | | 12/2009 | |
| WO | WO-2014117344 A1 | | 8/2014 | |

OTHER PUBLICATIONS

M. M. Hasan, S. Kwon and J.-H. Na, "Adaptive Mobility Load Balancing Algorithm for LTE Small-Cell Networks," in IEEE Transactions on Wireless Communications, vol. 17, No. 4, pp. 2205-2217, Apr. 2018. (Year: 2018).*

K. M. Addali, S. Y. Bani Melhem, Y. Khamayseh, Z. Zhang and M. Kadoch, "Dynamic Mobility Load Balancing for 5G Small-Cell Networks Based on Utility Functions," in IEEE Access, vol. 7, pp. 126998-127011, 2019 (Year: 2019).*

Chu, Congshan et al., "Research on Load Balancing Algorithm Based on Access Control in Phantom Cell", Electronic Design Engineering, vol. 26, No. 22, Nov. 30, 2018.

International Search Report (in English and Chinese) and Written Opinion of the International Searching Authority (Chinese) issued in PCT/CN2020/131431, dated Feb. 20, 2021; ISA/CN.

First Chinese Office Action regarding Application No. 201911174102. 4, dated Mar. 1, 2021.

* cited by examiner

US 11,889,354 B2

METHOD FOR LOAD IMBALANCE OPTIMIZATION UNDER SAME NETWORK COVERAGE, APPARATUS, DEVICE, AND STORAGE MEDIUM

This application is a U.S. National Phase Application under 35 U.S.C. 371 of International Application No. PCT/CN2020/131431, filed on Nov. 25, 2020, which claims priority to Chinese Patent Application No. 201911174102.4, titled "METHOD FOR LOAD IMBALANCE OPTIMIZATION UNDER SAME NETWORK COVERAGE BASED ON USER DATA", filed on Nov. 26, 2019 with the Chinese Patent Office, both of which are incorporated herein by reference in their entireties.

FIELD

The present disclosure relates to the technical field of communication, and in particular to a method, a device, and an apparatus for optimizing unbalanced loads covered by a same network and a storage medium.

BACKGROUND

A mobile communication network (such as long term evolution (LTE)) has an extensive coverage and a good user experience, and thus the number of users of mobile communication networks is growing rapidly. Therefore, the construction and optimization of networks are focused from extensive coverage to deep coverage and capacity coverage.

Currently, in order to meet the capacity demand and ensure the good user experience, multiband networking is used to improve the capacity of the mobile communication network. In the mobile communication network implemented by the multiband networking, different frequency bands (for example, a D1 frequency band, a D2 frequency band, a D3 frequency band, a F1 frequency band, a F2 frequency band, a F3 frequency band, a TDD1800 frequency band, and a FDD1800 frequency band) in a same base station correspond to different cells. In a case that the mobile communication network is implemented by the multiband networking, cells may be covered by a same network. The cells covered by the same network may include N (where N is an integer greater than 1) cells. The N cells include a reference cell and N−1 matching cells. A distance between a base station serving each of the matching cells and a base station serving the reference cell is less than a preset distance threshold, and a difference between an azimuth of the matching cell and an azimuth of the reference cell is less than a preset angle threshold. If a user equipment is located in an area of the cells covered by a same network, the user equipment may access to any one of the cells covered by the same network. However, in practices, loads of cells covered by a same network may be unbalanced. For example, user equipments located in the area of the cells covered by a same network mostly access to a same cell (in such case, most users may have a poor network experience, for example, a slow data transmission speed), while a few of the user equipments access to other cells covered by the same network. Therefore, it is required to optimize cells covered by a same network.

SUMMARY

A method, a device, and an apparatus for optimizing unbalanced loads covered by a network and a storage medium are provided according to the present disclosure, to optimize unbalanced loads in cells covered by a same network. The present disclosure includes the following technical solutions.

A method for optimizing unbalanced loads covered by a same network is provided. The method includes: determining whether loads of cells covered by a same network are balanced; determining, if it is determined that the loads of the cells covered by the same network are unbalanced, a cell with a highest network load rate and a cell with a lowest network load rate in the cells covered by the same network; determining a target offset parameter corresponding to a predetermined index according to a timing advance and the number of sampling points of the cell with the highest network load rate and a timing advance and the number of sampling points of the cell with the lowest network load rate, where the predetermined index is an index to which a user equipment refers when selecting a cell; and adjusting a load of the cell with the highest network load rate and a load of the cell with the lowest network load rate based on the target offset parameter, to make the number of the sampling points of the cell with the highest network load rate be less than or equal to the number of the sampling points of the cell with the lowest network load rate.

In the above method, preferably, the determining a target offset parameter corresponding to a predetermined index according to a timing advance and the number of sampling points of the cell with the highest network load rate and a timing advance and the number of sampling points of the cell with the lowest network load rate includes: determining whether a distribution of the timing advance of the cell with the highest network load rate is similar to a distribution of the timing advance of the cell with the lowest network load rate; adjusting, if the distribution of the timing advance of the cell with the highest network load rate is not similar to the distribution of the timing advance of the cell with the lowest network load rate, an antenna down-tilt angle of the cell with the lowest network load rate to be the same as an antenna down-tilt angle of the cell with the highest network load rate, and determining the target offset parameter corresponding to the predetermined index; and directly determining, if the distribution of the timing advance of the cell with the highest network load rate is similar to the distribution of the timing advance of the cell with the lowest network load rate, the target offset parameter corresponding to the predetermined index.

In the above method, preferably, the determining the target offset parameter corresponding to the predetermined index includes: adjusting an initial offset parameter to acquire an intermediate offset parameter, where the intermediate offset parameter is a minimum integer capable of making a difference between a value of the predetermined index of the cell with the highest network load rate and the intermediate offset parameter be less than a value of the predetermined index of the cell with the lowest network load rate; determining, if the value of the predetermined index of the cell with the highest network load rate is reduced by the intermediate offset parameter, whether the number of the sampling points of the cell with the highest network load rate is greater than the number of the sampling points of the cell with the lowest network load rate; increasing, if it is determined that the number of the sampling points of the cell with the highest network load rate is greater than the number of the sampling points of the cell with the lowest network load rate in a case that the value of the predetermined index of the cell with the highest network load rate is reduced by the intermediate offset parameter, the intermediate offset parameter by a predetermined step and determining the increased intermediate offset parameter as a new intermediate offset parameter, and performing the operation of determining, if the value of the predetermined index of the cell with the highest network load rate is reduced by the intermediate offset parameter, whether the number of the sampling points of the cell with the highest network load rate is greater than the number of the sampling points of the cell with the lowest network load rate; and determining, if it is determined that the number of the sampling points of the cell with the highest network load rate is not greater than the number of the sampling points of the cell with the lowest network load rate in a case that the value of the predetermined index of the cell with the highest network load rate is reduced by the intermediate offset parameter, a newest intermediate offset parameter as the target offset parameter.

In the above method, preferably, the determining, if the value of the predetermined index of the cell with the highest network load rate is reduced by the intermediate offset parameter, whether the number of the sampling points of the cell with the highest network load rate is greater than the number of the sampling points of the cell with the lowest network load rate includes: acquiring, for each of the sampling points of the cell with the highest network load rate, a difference between the value of the predetermined index of the cell with the highest network load rate corresponding to the sampling point and the intermediate offset parameter, as a candidate index value corresponding to the sampling point; comparing the candidate index value with the value of the predetermined index of the cell with the lowest network load rate corresponding to the sampling point, to determine a candidate sampling point, where the value of the predetermined index of the cell with the lowest network load rate corresponding to the candidate sampling point is greater than the candidate index value; comparing a difference Y1 between the number of the sampling points of the cell with the highest load rate and the number of the candidate sampling points with a sum Y2 of the number of the sampling points of the cell with the lowest load rate and the number of the candidate sampling points; and determining, in a case that Y1 is greater than Y2, that if the value of the predetermined index of the cell with the highest network load rate is reduced by the intermediate offset parameter, the number of the sampling points of the cell with the highest network load rate is greater than the number of the sampling points of the cell with the lowest network load rate.

In the above method, preferably, the adjusting a load of the cell with the highest network load rate and a load of the cell with the lowest network load rate based on the target offset parameter includes: transmitting the target offset parameter to a target user equipment, where the target user equipment performs cell reselection or cell switching according to the target offset parameter, to make the number of the sampling points of the cell with the highest network load rate be less than the number of the sampling points of the cell with the lowest network load rate, where the target user equipment is a user equipment which initially accesses to the network of the cells covered by the same network by soft switching, or the target user equipment is a user equipment which is in an operation state and which accesses to the cell with the highest network load rate by soft switching.

A device for optimizing unbalanced loads covered by a same network is provided. The device includes: a judgment module, configured to determine whether loads of cells covered by a same network are balanced; a first determination module, configured to determine, if the judgment module determines that the loads of the cells covered by the same network are unbalanced, a cell with a highest network load rate and a cell with a lowest network load rate in the cells covered by the same network; a second determination module, configured to determine a target offset parameter corresponding to a predetermined index according to a timing advance and the number of sampling points of the cell with the highest network load rate and a timing advance and the number of sampling points of the cell with the lowest network load rate, where the predetermined index is an index to which a user equipment refers when selecting a cell; and an adjustment module, configured to adjust a load of the cell with the highest network load rate and a load of the cell with the lowest network load rate based on the target offset parameter, to make the number of the sampling points of the cell with the highest network load rate be less than the number of the sampling points of the cell with the lowest network load rate.

In the above device, preferably, the second determination module includes: a judgment unit, configured to determine whether a distribution of the timing advance of the cell with the highest network load rate is similar to a distribution of the timing advance of the cell with the lowest network load rate; and a determination unit, configured to: adjust, if the judgment unit determines that the distribution of the timing advance of the cell with the highest network load rate is not similar to the distribution of the timing advance of the cell with the lowest network load rate, an antenna down-tilt angle of the cell with the lowest network load rate to be the same as an antenna down-tilt angle of the cell with the highest network load rate, and determine the target offset parameter corresponding to the predetermined index; and directly determine, if the judgment unit determines that the distribution of the timing advance of the cell with the highest network load rate is similar to the distribution of the timing advance of the cell with the lowest network load rate, the target offset parameter corresponding to the predetermined index.

In the above device, preferably, for determining the target offset parameter corresponding to the predetermined index, the determination unit is configured to: adjust an initial offset parameter to acquire an intermediate offset parameter, where the intermediate offset parameter is a minimum integer capable of making a difference between a value of the predetermined index of the cell with the highest network load rate and the intermediate offset parameter be less than a value of the predetermined index of the cell with the lowest network load rate; determine, if the value of the predetermined index of the cell with the highest network load rate is reduced by the intermediate offset parameter, whether the number of the sampling points of the cell with the highest network load rate is greater than the number of the sampling points of the cell with the lowest network load rate; increase, if it is determined that the number of the sampling points of the cell with the highest network load rate is greater than the number of the sampling points of the cell with the lowest network load rate in a case that the value of the predetermined index of the cell with the highest network load rate is reduced by the intermediate offset parameter, the intermediate offset parameter by a predetermined step and determine the increased intermediate offset parameter as a new intermediate offset parameter, and perform the operation of determining, if the value of the predetermined index of the cell with the highest network load rate is reduced by the intermediate offset parameter, whether the number of the sampling points of the cell with the highest network load rate is greater than the number of the sampling points of the cell with the lowest network load rate; and determine, if it is determined that the number of the sampling points of the cell with the highest network load rate is not greater than the number of the sampling points of the cell with the lowest network load rate in a case that the value of the predetermined index of the cell with the highest network load rate is reduced by the intermediate offset parameter, a newest intermediate offset parameter as the target offset parameter.

In the above device, preferably, for determining, if the value of the predetermined index of the cell with the highest network load rate is reduced by the intermediate offset parameter, whether the number of the sampling points of the cell with the highest network load rate is greater than the number of the sampling points of the cell with the lowest network load rate, the determination unit is configured to: acquire, for each of the sampling points of the cell with the highest network load rate, a difference between the value of the predetermined index of the cell with the highest network load rate corresponding to the sampling point and the intermediate offset parameter, as a candidate index value corresponding to the sampling point; compare the candidate index value with the value of the predetermined index of the cell with the lowest network load rate corresponding to the sampling point, to determine a candidate sampling point, where the value of the predetermined index of the cell with the lowest network load rate corresponding to the candidate sampling point is greater than the candidate index value; compare a difference Y1 between the number of the sampling points of the cell with the highest load rate and the number of the candidate sampling points with a sum Y2 of the number of the sampling points of the cell with the lowest load rate and the number of the candidate sampling points; and determine, in a case that Y1 is greater than Y2, that if the value of the predetermined index of the cell with the highest network load rate is reduced by the intermediate offset parameter, the number of the sampling points of the cell with the highest network load rate is greater than the number of the sampling points of the cell with the lowest network load rate.

In the above device, preferably, the adjustment module is configured to: transmit the target offset parameter to a target user equipment, where the target user equipment performs cell reselection or cell switching according to the target offset parameter, to make the number of the sampling points of the cell with the highest network load rate be less than the number of the sampling points of the cell with the lowest network load rate, where the target user equipment is a user equipment which initially accesses to the network of the cells covered by the same network by soft switching, or the target user equipment is a user equipment which is in an operation state and which accesses to the cell with the highest network load rate by soft switching.

An apparatus for optimizing unbalanced loads covered by a same network is provided. The apparatus includes: a memory configured to store a program; and a processor configured to execute the program to perform the method for optimizing unbalanced loads covered by a same network described above.

A readable storage medium is provided. The readable storage medium stores a computer program. The computer program, when executed by a processor, causes the processor to perform the method for optimizing unbalanced loads covered by a same network described above.

It can be seen from the above solution that in the method, the device and the apparatus for optimizing unbalanced loads covered by a same network and the storage medium according to the present disclosure, in a case that loads of cells covered by a same network are unbalanced, a cell with a highest network load rate and a cell with a lowest network load rate are determined in the cells covered by a same network, a target offset parameter corresponding to a predetermined index is determined according to a timing advance and the number of sampling points of the cell with the highest network load rate and a timing advance and the number of sampling points of the cell with the lowest network load rate, the predetermined index is an index to which a user equipment refers when selecting a cell, and a load of the cell with the highest network load rate and a load of the cell with the lowest network load rate are adjusted based on the target offset parameter, so that the number of the sampling points of the cell with the highest network load rate is less than the number of the sampling points of the cell with the lowest network load rate, thereby achieving the automatic network optimization of the unbalanced loads covered by a same network and improving the accuracy of the optimization.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

Terms such as "first", "second", "third", and "fourth" (if exists) in the description, claims and the above drawings are only used to distinguish similar objects, rather than describe a particular or chronological order. It should be understood that data used in the above way may be exchanged in an appropriate case, such that the embodiments of the present disclosure described here can be implemented in an order different from the order shown or described here.

DETAILED DESCRIPTION

The technical solutions in the embodiments of the present disclosure are described clearly and completely in conjunction with the drawings in the embodiments of the present disclosure hereinafter. It is apparent that the described embodiments are only some embodiments of the present disclosure, rather than all embodiments. All other embodiments obtained by those skilled in the art based on the embodiments of the present disclosure without any creative work fall within the protection scope of the present disclosure.

The inventor of the present disclosure found that in a case that loads of cells covered by a same network are unbalanced, an optimization strategy is mainly determined by manually analyzing performance data, alarm data, industrial data and other data of a network element. However, the optimization strategy determined manually depends on optimization experience, resulting in low accurate and low efficient. Based on this, an automatic method for optimizing unbalanced loads covered by a same network is provided according to an embodiment of the present disclosure, to improve the efficiency and accuracy of the method for optimizing unbalanced loads covered by a same network.

In the embodiment of the present disclosure, in a mobile communication network, cells covered by a same network may be identified periodically, for example, once a day. Each time cells covered by a same network are identified, unbalanced loads in the cells covered by a same network are optimized through an optimization method described in the following embodiments. A method for identifying cells covered by a same network may be provided by the operator, which is not described in detail herein.

Figure 1:
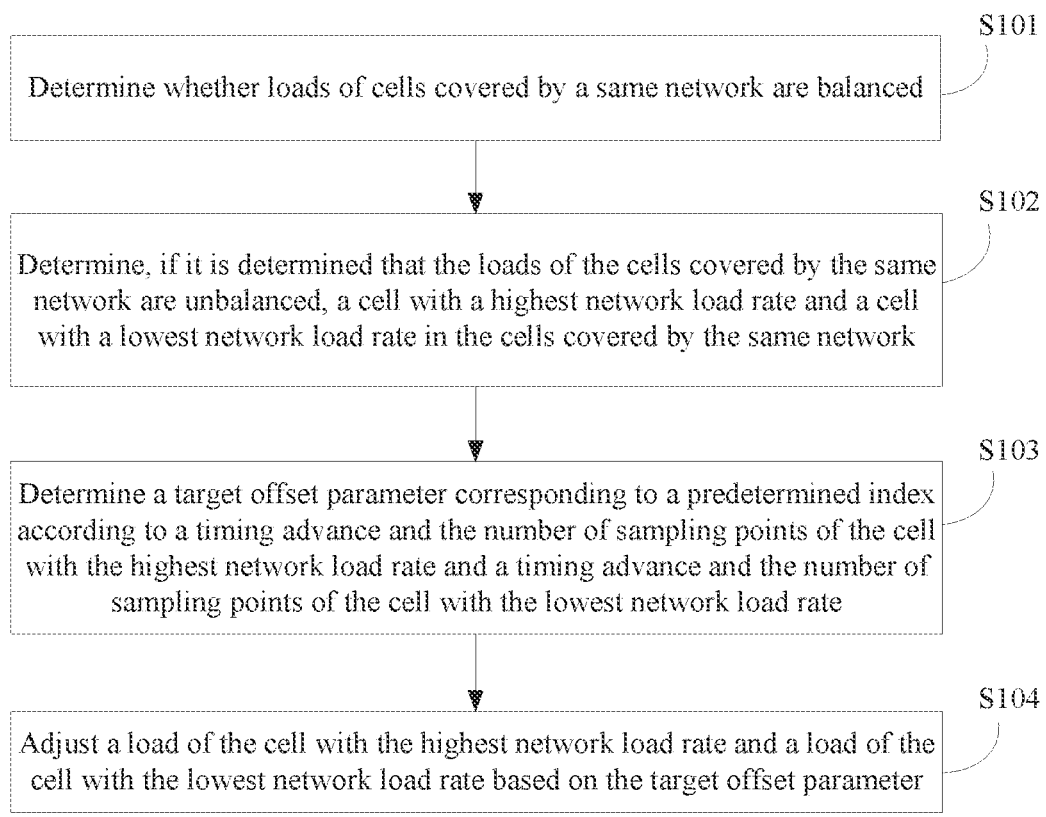
FIG. 1 is a flow chart of a method for optimizing unbalanced loads covered by a same network according to an embodiment of the present disclosure.

A flow chart of a method for optimizing unbalanced loads covered by a same network according to an embodiment of the present disclosure is shown in FIG. 1. The method includes the following steps S101 to S104.

In step S101, it is determined whether loads of cells covered by a same network are balanced.

In an embodiment, it may be determined whether the loads of the cells covered by the same network are balanced through a wireless utilization rate of a cell during busy hours. The wireless utilization rate of the cell during busy hours is calculated by a base station. In the embodiment of the present disclosure, the wireless utilization rate of the cell during busy hours may be acquired directly from a network management server communicating with the base station. It may be determined whether the loads of the cells covered by the same network are balanced in the following ways. It is determined whether cells covered by a same network meet at least one of the following conditions including a first condition to a fourth condition. If cells covered by a same network meet at least one of the following conditions, it is determined that loads of the cells covered by the same network are balanced.

In the first condition, for a D frequency band group (including a D1 frequency band, a D2 frequency band, and a D3 frequency band), a highest wireless utilization rate of a cell among the cells during busy hours is greater than 50%, and a difference between the highest wireless utilization rate of the cell during busy hours and a lowest wireless utilization rate of a cell among the cells during busy hours is greater than 20%. That is, in a case that cells covered by a same network include cells with at least two D frequency bands (including at least two of the three frequency bands D1, D2 and D3), if the cells with at least two D frequency bands meet the above condition, loads of the cells covered by the same network are unbalanced.

In a second condition, for a F frequency band group (including a F1 frequency band, a F2 frequency band, and a F3 frequency band), a highest wireless utilization rate of a cell among the cells during busy hours is greater than 50%, and a wireless utilization rate of the F1 frequency band during busy hours is more than 30% greater than a wireless utilization rate of the F2 frequency band during busy hours, or the wireless utilization rate of the F2 frequency band during busy hours is more than 10% greater than the wireless utilization rate of the F1 frequency band during busy hours. That is, in a case that cells covered by a same network include cells with at least two F frequency bands (that is, the F1 frequency band and the F2 frequency band), if the cells with at least two F frequency bands meet the above condition, loads of the cells covered by the same network are unbalanced.

In a third condition, for a D/F frequency band group, a wireless utilization rate of the D frequency band or the F frequency band during busy hours is greater than 50%, and a difference between a wireless utilization rate of the D frequency band during busy hours and a wireless utilization rate of the F frequency band during busy hours is greater than 20%. That is, in a case that cells covered by a same network include both a cell with the D frequency band and a cell with the F frequency band, if the wireless utilization rate of the D frequency band during busy hours (that is, an average of wireless utilization rates of all D frequency bands in the cells covered by the same network during busy hours) is greater than 50%, or the wireless utilization rate of the F frequency band during busy hours (that is, an average of wireless utilization rates of all F frequency bands in the cells covered by the same network during busy hours) is greater than 50%, and the difference between the wireless utilization rate of the D frequency band during busy hours and the wireless utilization rate of the F frequency band during busy hours is greater than 20%, loads of the cells covered by the same network are unbalanced.

In a fourth condition, for a TDD/FDD1800 frequency band group, a wireless utilization rate of a cell with the FDD1800 frequency band during busy hours is greater than 70%, or a wireless utilization rate of a cell with the TDD frequency band during busy hours is greater than 50%, and the wireless utilization rate of the cell with the FDD1800 frequency band during busy hours is more than 20% greater than the wireless utilization rate of the cell with the TDD frequency band during busy hours, or the wireless utilization rate of the cell with the TDD frequency band during busy hours is greater than the wireless utilization rate of the cell with the FDD1800 frequency band during busy hours. That is, in a case that cells covered by a same network includes both the cell with the TDD frequency band and the cell with the FDD1800 frequency band, if the wireless utilization rate of the cell with the FDD1800 frequency band during busy hours is greater than 70% or the wireless utilization rate of the cell with the TDD frequency band during busy hours is greater than 50%, and the wireless utilization rate of the cell with the FDD1800 frequency band during busy hours is more than 20% greater than the wireless utilization rate of the cell with the TDD frequency band during busy hours or the wireless utilization rate of the cell with the TDD frequency band during busy hours is greater than the wireless utilization rate of the cell with the FDD1800 frequency band during busy hours, loads of the cells covered by the same network are unbalanced. In a case that the cells covered by the same network include multiple cells with the TDD frequency band, the wireless utilization rate of the cell with the TDD frequency band during busy hours is an average of wireless utilization rates of the multiple cells with the TDD frequency band during busy hours. In addition, in a case that the cells covered by the same network include multiple cells with the FDD1800 frequency band, the wireless utilization rate of the cell with the FDD1800 frequency band during busy hours is an average of wireless utilization rates of the multiple cells with the FDD1800 frequency band during busy hours.

In step S102, if it is determined that the loads of the cells covered by the same network are unbalanced, a cell with a highest network load rate and a cell with a lowest network load rate are determined in the cells covered by the same network.

A network load rate of a cell may be acquired directly from a data acquisition interface provided by a network operator, or may be acquired by a method for calculating a network load rate provided by the network operator. The method for calculating a network load rate is not a focus of the present disclosure, which is not described in detail herein.

In step S103, a target offset parameter corresponding to a predetermined index is determined according to a timing advance and the number of sampling points of the cell with the highest network load rate and a timing advance and the number of sampling points of the cell with the lowest network load rate. A user equipment refers to the predetermined index when selecting a cell. For example, the predetermined index may be a reference signal receiving power (RSRP). The target offset parameter is an offset of the RSRP.

The timing advance (TA) may be acquired from a measurement report reported by the user equipment (that is normally a mobile phone) to the base station. TA represents a distance between the user equipment and the base station. The measurement report herein may be a measurement report of origin (MRO).

The number of sampling points is the number of measurement reports reported by the user equipment. In the mobile communication network, each user equipment reports a measurement report to the base station every a time period (such as, 5.12 seconds), and the measurement report reported by the user equipment to the base station is a sampling point.

In step S104, a load of the cell with the highest network load rate and a load of the cell with the lowest network load rate are adjusted based on the target offset parameter, so that the number of the sampling points of the cell with the highest network load rate is less than or equal to the number of the sampling points of the cell with the lowest network load rate.

After determining the target offset parameter, the base station may transmit the target offset parameter to the user equipment, the user equipment performs offset calculation on an actually detected predetermined index according to the target offset parameter, and then performs cell reselection or cell switching to a cell by using a value of the predetermined index acquired by the offset calculation, so that the number of sampling points of the cell with the highest network load rate is less than the number of sampling points of the cell with the lowest network load rate.

In the method for optimizing unbalanced loads covered by a same network according to the embodiment of the present disclosure, in a case that loads of cells covered by a same network are unbalanced, a cell with a highest network load rate and a cell with a lowest network load rate are determined in the cells covered by a same network, a target offset parameter corresponding to a predetermined index is determined according to a timing advance and the number of sampling points of the cell with the highest network load rate and a timing advance and the number of sampling points of the cell with the lowest network load rate, the predetermined index is an index to which a user equipment refers when selecting a cell, and a load of the cell with the highest network load rate and a load of the cell with the lowest network load rate are adjusted based on the target offset parameter, so that the number of the sampling points of the cell with the highest network load rate is less than the number of the sampling points of the cell with the lowest network load rate, thereby achieving the automatic network optimization of the unbalanced loads covered by a same network and improving the accuracy of the optimization.

In an embodiment, the determining a target offset parameter corresponding to a predetermined index according to a timing advance and the number of sampling points of the cell with the highest network load rate and a timing advance and the number of sampling points of the cell with the lowest network load rate may be implemented as follows.

It is determined whether a distribution of the timing advance of the cell with the highest network load rate is similar to a distribution of the timing advance of the cell with the lowest network load rate.

A distribution of a timing advance of a cell (which is described as a cell C for convenience of description) may be a proportion of sampling points with a TA less than a preset threshold in all sampling points received by the cell C during busy hours. The preset threshold may be a timing advance corresponding to a coverage range of the base station. The coverage range of the base station is a radius of the coverage area of the base station.

Based on this, it may be judged whether the distribution of the timing advance of the cell with the highest network load rate is similar to the distribution of the timing advance of the cell with the lowest network load rate in the following ways. The distribution (which is described as a first distribution for convenience of description) of the timing advance of the cell with the highest network load rate and the distribution (which is described as a second distribution for convenience of description) of the timing advance of the cell with the lowest network load rate are acquired. If a difference between the first distribution and the second distribution is within a preset range, it is determined that the distribution of the timing advance of the cell with the highest network load rate is similar to the distribution of the timing advance of the cell with the lowest network load rate. If the difference between the first distribution and the second distribution is outside the preset range, it is determined that the distribution of the timing advance of the cell with the highest network load rate is not similar to the distribution of the timing advance of the cell with the lowest network load rate.

If the distribution of the timing advance of the cell with the highest network load rate is not similar to the distribution of the timing advance of the cell with the lowest network load rate, an antenna down-tilt angle of the cell with the lowest network load rate is adjusted to be the same as an antenna down-tilt angle of the cell with the highest network load rate, and the target offset parameter corresponding to the predetermined index is determined.

By adjusting the antenna down-tilt angle of the cell with the lowest network load rate to be the same as the antenna down-tilt angle of the cell with the highest network load rate, the distribution of the timing advance of the cell with the lowest network load rate may be close to the distribution of the timing advance of the cell with the highest network load rate, or the distribution of the timing advance of the cell with the lowest network load rate may be similar to the distribution of the timing advance of the cell with the highest network load rate.

If the distribution of the timing advance of the cell with the highest network load rate is similar to the distribution of the timing advance of the cell with the lowest network load rate, the target offset parameter corresponding to the predetermined index is directly determined.

If the distribution of the timing advance of the cell with the highest network load rate is similar to distribution of the timing advance of the cell with the lowest network load rate, the antenna down-tilt angle of the cell with the lowest network load rate is not required to be adjusted, and the target offset parameter corresponding to the predetermined index may be directly determined.

Figure 2:
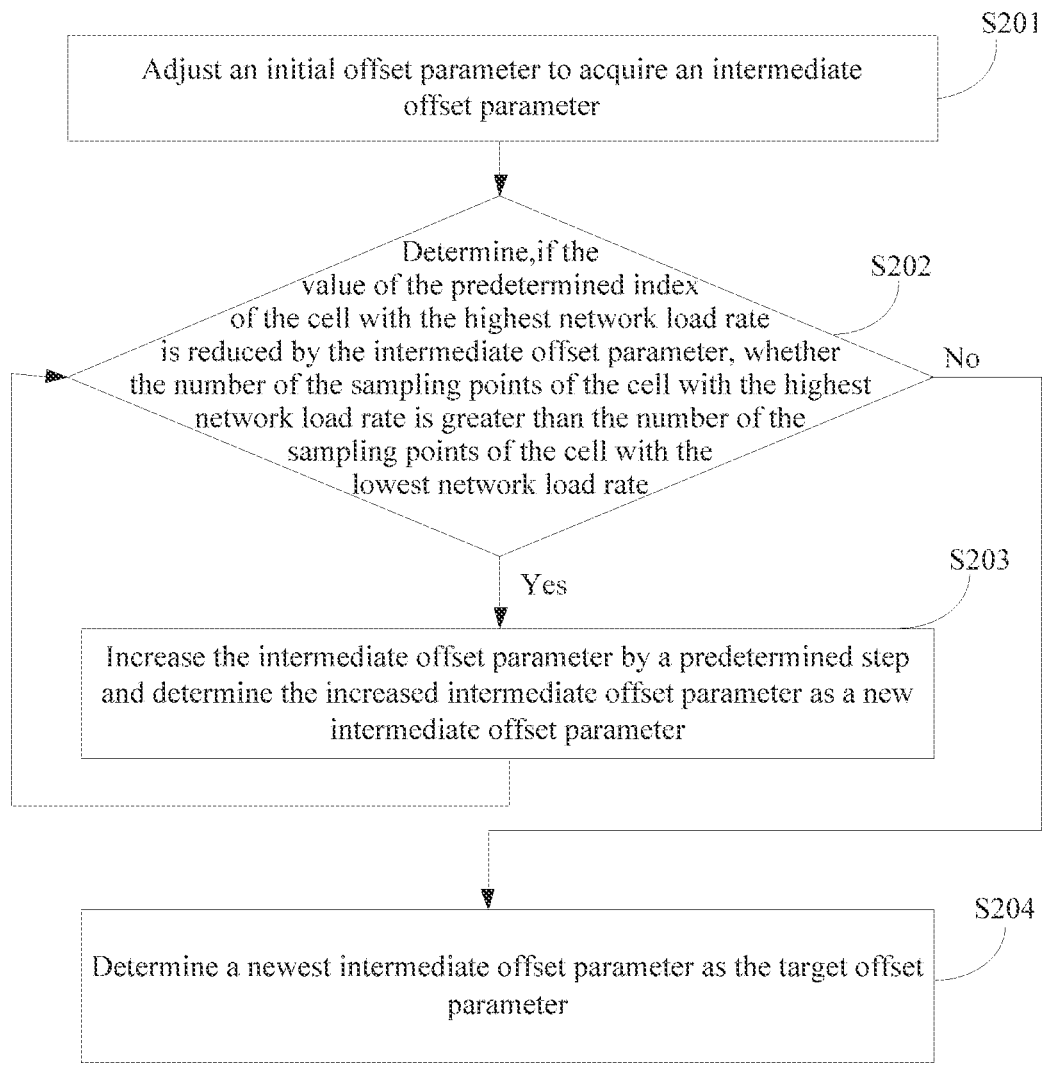
FIG. 2 is a flow chart of a method for determining a target offset parameter corresponding to a predetermined index according to an embodiment of the present disclosure.

In an embodiment, a flow chart of a method for determining a target offset parameter corresponding to a predetermined index is shown in FIG. 2. The method may include the following steps S201 to S204.

In step S201, an initial offset parameter is adjusted to acquire an intermediate offset parameter. The intermediate offset parameter is a minimum integer capable of making a difference between a value of the predetermined index of the cell with the highest network load rate and the intermediate offset parameter be less than a value of the predetermined index of the cell with the lowest network load rate.

In a case that the difference between the value of the predetermined index of the cell with the higher network load rate and the offset parameter is less than a value of the predetermined index of the cell with the lower network load rate, a user equipment accessing to the cell with the higher network load rate may be switched to the cell with the lower network load rate, so that a sampling point of the cell with the higher network load rate is allocated to the cell with the lower network load rate. The initial offset parameter may be zero.

In step S202, it is determined, if the value of the predetermined index of the cell with the highest network load rate is reduced by the intermediate offset parameter, whether the number of the sampling points of the cell with the highest network load rate is greater than the number of the sampling points of the cell with the lowest network load rate. If it is determined, if the value of the predetermined index of the cell with the highest network load rate is reduced by the intermediate offset parameter, that the number of the sampling points of the cell with the highest network load rate is greater than the number of the sampling points of the cell with the lowest network load rate, step S203 is performed. If it is determined, if the value of the predetermined index of the cell with the highest network load rate is reduced by the intermediate offset parameter, that the number of the sampling points of the cell with the highest network load rate is not greater than the number of the sampling points of the cell with the lowest network load rate, step S204 is performed.

Here, the value of the predetermined index of the cell with the highest network load rate is not really reduced by the intermediate offset parameter, it is assumed that the value of the predetermined index of the cell with the highest network load rate is reduced by the intermediate offset parameter, to determine whether the number of the sampling points of the cell with the highest network load rate is greater than the number of the sampling points of the cell with the lowest network load rate. The operation of determining, if the value of the predetermined index of the cell with the highest network load rate is recreased by the intermediate offset parameter, whether the number of the sampling points of the cell with the highest network load rate is greater than the number of the sampling points of the cell with the lowest network load rate may be implemented as follows.

For each of the sampling points of the cell with the highest network load rate, a difference between the value of the predetermined index of the cell with the highest network load rate corresponding to the sampling point and the intermediate offset parameter is acquired as a candidate index value corresponding to the sampling point.

The candidate index value is compared with the value of the predetermined index of the cell with the lowest network load rate corresponding to the sampling point, to determine a candidate sampling point. The value of the predetermined index of the cell with the lowest network load rate corresponding to the candidate sampling point is greater than the candidate index value.

A difference (which is described as Y1 for convenience of description) between the number of the sampling points of the cell with the highest load rate and the number of the candidate sampling points is compared with a sum (which is described as Y2 for convenience of description) of the number of the sampling points of the cell with the lowest load rate and the number of the candidate sampling points.

In a case that Y1 is less than or equal to Y2, it is determined that, if the value of the predetermined index of the cell with the highest network load rate is reduced by the intermediate offset parameter, the number of the sampling points of the cell with the highest network load rate is less than or equal to the number of the sampling points of the cell with the lowest network load rate. In a case that Y1 is greater than to Y2, it is determined that, if the value of the predetermined index of the cell with the highest network load rate is reduced by the intermediate offset parameter, the number of the sampling points of the cell with the highest network load rate is greater than the number of the sampling points of the cell with the lowest network load rate.

In step S203, the intermediate offset parameter is increased by a predetermined step and the increased intermediate offset parameter is determined as a new intermediate offset parameter, and step S202 is performed.

In step S204, a newest intermediate offset parameter is determined as the target offset parameter.

The newest intermediate offset parameter the intermediate offset parameter used in performing step S202 for the last time.

In an embodiment, the adjusting a load of the cell with the highest network load rate and a load of the cell with the lowest network load rate based on the target offset parameter may include: transmitting the target offset parameter to a target user equipment, so that the target user equipment performs cell reselection or cell switching according to the target offset parameter, to make the number of the sampling points of the cell with the highest network load rate be less than the number of the sampling points of the cell with the lowest network load rate. The target user equipment is a user equipment which initially accesses to the network of the cells covered by the same network by soft switching, or the target user equipment is a user equipment which is in an operation state and which accesses to the cell with the highest network load rate by soft switching.

In an embodiment of the present disclosure, after acquiring the target offset parameter, the target offset parameter is transmitted to the target user equipment. The target user equipment adjusts the acquired predetermined index by using the target offset parameter, and then accesses a cell or is switched to another cell by using the adjusted predetermined index.

In an embodiment of the present disclosure, after acquiring the adjusted predetermined index, the target user equipment may select a to-be-accessed cell from all adjacent cells of a cell accessed by the target user equipment when the target user equipment selects a to-be-accessed cell.

In an embodiment, an effective adjacent cell may further be specified when the target offset parameter is transmitted to the target user equipment. Based on this, after acquiring the adjusted predetermined index, the target user equipment may only determine specified effective adjacent cells from all adjacent cells of the cell accessed by the target user equipment when the target user equipment selects the to-beaccessed cell, and then selects a to-be-accessed cell only from the specified effective adjacent cells.

In an embodiment, after optimizing the network according to the above solution of the antenna down-tilt angle and the optimization solution based on sampling points, it is required to determine again whether loads of cells covered by the same network are balanced. If the loads of the cells are unbalanced, it is required to continue to optimize the network based on the above solution of the antenna down-tilt angle and the optimization solution according to sampling points. If the loads of the cells are balanced, the optimization process ended. In a case that the number of the sampling points of the cell with the highest network load rate is less than or equal to the number of the sampling points of the cell with the lowest network load rate, it may be determined again whether the loads of the cells covered by a same network are balanced. If it is determined that the loads of the cells are unbalanced, a cell with the highest network load rate and a cell with the lowest network load rate in the cells covered by the same network are re-determined, to perform again the method for optimizing unbalanced loads covered by a same network according to the above embodiments, until the loads of the cells covered by the same network are balanced. If it is determined that the loads of the cells are balanced, the process ended.

In an embodiment, the number of the cell with the highest network load rate may be one or more, and the number of the cell with the lowest network load rate may be one or more. In a case that the number of the cells with the highest network load rate is multiple, the number of the sampling points of the cell with the highest network load rate in the above embodiment refers to a sum of the number of sampling points of all cells with the highest network load rate. In addition, in a case that the number of the cells with the lowest network load rate is multiple, the number of the sampling points of the cell with the lowest network load rate in the above embodiment refers to a sum of the number of sampling points of all cells with the lowest load rate.

In an embodiment, in a case that the number of the cells with the highest network load rate is multiple, the adjusting an antenna down-tilt angle of the cell with the lowest network load rate to be the same as an antenna down-tilt angle of the cell with the highest network load rate includes: calculating an average of antenna down-tilt angles of all cells with the highest network load rate (which is described as a down-tilt angle average for convenience of description), and adjusting an antenna down-tilt angle of the cell with the lowest network load rate to the down-tilt angle average.

Figure 3:
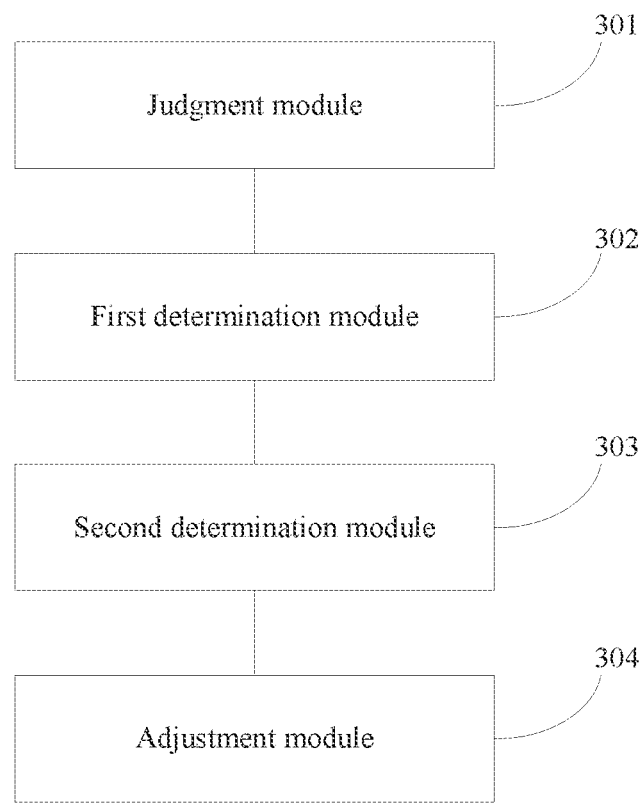
FIG. 3 is a schematic structural diagram of a device for optimizing unbalanced loads covered by a same network according to an embodiment of the present disclosure.

Corresponding to the embodiments of the method, a device for optimizing unbalanced loads covered by a same network is further provided according to an embodiment of the present disclosure. A schematic structural diagram of a device for optimizing unbalanced loads covered by a same network according to an embodiment of the present disclosure is shown in FIG. 3. The device may include a judgment module 301, a first determination module 302, a second determination module 303 and an adjustment module 304. The judgment module 301 is configured to determine whether loads of cells covered by a same network are balanced. The first determination module 302 is configured to determine, if the judgment module determines that the loads of the cells covered by the same network are unbalanced, a cell with a highest network load rate and a cell with a lowest network load rate in the cells covered by the same network. The second determination module 303 is configured to determine a target offset parameter corresponding to a predetermined index according to a timing advance and the number of sampling points of the cell with the highest network load rate and a timing advance and the number of sampling points of the cell with the lowest network load rate, where the predetermined index is an index to which a user equipment refers when selecting a cell. The adjustment module 304 is configured to adjust a load of the cell with the highest network load rate and a load of the cell with the lowest network load rate based on the target offset parameter, to make the number of the sampling points of the cell with the highest network load rate be less than the number of the sampling points of the cell with the lowest network load rate.

In the device for optimizing unbalanced loads covered by a same network according to the present disclosure, in a case that loads of cells covered by a same network are unbalanced, a cell with a highest network load rate and a cell with a lowest network load rate are determined in the cells covered by a same network, a target offset parameter corresponding to a predetermined index is determined according to a timing advance and the number of sampling points of the cell with the highest network load rate and a timing advance and the number of sampling points of the cell with the lowest network load rate, the predetermined index is an index to which a user equipment refers when selecting a cell, and a load of the cell with the highest network load rate and a load of the cell with the lowest network load rate are adjusted based on the target offset parameter, so that the number of the sampling points of the cell with the highest network load rate is less than the number of the sampling points of the cell with the lowest network load rate, thereby achieving the automatic network optimization of the unbalanced loads covered by a same network and improving the accuracy of the optimization.

In an embodiment, the second determination module 303 includes a judgment unit and a determination unit. The judgment unit is configured to determine whether a distribution of the timing advance of the cell with the highest network load rate is similar to a distribution of the timing advance of the cell with the lowest network load rate. The determination unit is configured to: adjust, if the judgment unit determines that the distribution of the timing advance of the cell with the highest network load rate is not similar to the distribution of the timing advance of the cell with the lowest network load rate, an antenna down-tilt angle of the cell with the lowest network load rate to be the same as an antenna down-tilt angle of the cell with the highest network load rate, and determine the target offset parameter corresponding to the predetermined index; and directly determine, if the judgment unit determines that the distribution of the timing advance of the cell with the highest network load rate is similar to the distribution of the timing advance of the cell with the lowest network load rate, the target offset parameter corresponding to the predetermined index.

In an embodiment, for determining the target offset parameter corresponding to the predetermined index, the determination unit is configured to: adjust an initial offset parameter to acquire an intermediate offset parameter, where the intermediate offset parameter is a minimum integer capable of making a difference between a value of the predetermined index of the cell with the highest network load rate and the intermediate offset parameter be less than a value of the predetermined index of the cell with the lowest network load rate; determine, if the value of the predetermined index of the cell with the highest network load rate is reduced by the intermediate offset parameter, whether the number of the sampling points of the cell with the highest network load rate is greater than the number of the sampling points of the cell with the lowest network load rate; increase, if it is determined that the number of the sampling points of the cell with the highest network load rate is greater than the number of the sampling points of the cell with the lowest network load rate in a case that the value of the predetermined index of the cell with the highest network load rate is reduced by the intermediate offset parameter, the intermediate offset parameter by a predetermined step and determine the increased intermediate offset parameter as a new intermediate offset parameter, and perform the operation of determining, if the value of the predetermined index of the cell with the highest network load rate is reduced by the intermediate offset parameter, whether the number of the sampling points of the cell with the highest network load rate is greater than the number of the sampling points of the cell with the lowest network load rate; and determine, if it is determined that the number of the sampling points of the cell with the highest network load rate is not greater than the number of the sampling points of the cell with the lowest network load rate in a case that the value of the predetermined index of the cell with the highest network load rate is reduced by the intermediate offset parameter, a newest intermediate offset parameter as the target offset parameter.

In an embodiment, for determining, if the value of the predetermined index of the cell with the highest network load rate is reduced by the intermediate offset parameter, whether the number of the sampling points of the cell with the highest network load rate is greater than the number of the sampling points of the cell with the lowest network load rate, the determination unit is configured to: acquire, for each of the sampling points of the cell with the highest network load rate, a difference between the value of the predetermined index of the cell with the highest network load rate corresponding to the sampling point and the intermediate offset parameter, as a candidate index value corresponding to the sampling point; compare the candidate index value with the value of the predetermined index of the cell with the lowest network load rate corresponding to the sampling point, to determine a candidate sampling point, where the value of the predetermined index of the cell with the lowest network load rate corresponding to the candidate sampling point is greater than the candidate index value; compare a difference Y1 between the number of the sampling points of the cell with the highest load rate and the number of the candidate sampling points with a sum Y2 of the number of the sampling points of the cell with the lowest load rate and the number of the candidate sampling points; and determine, in a case that Y1 is greater than Y2, that if the value of the predetermined index of the cell with the highest network load rate is reduced by the intermediate offset parameter, the number of the sampling points of the cell with the highest network load rate is greater than the number of the sampling points of the cell with the lowest network load rate.

In an embodiment, the adjustment module 304 is configured to: transmit the target offset parameter to a target user equipment, where the target user equipment performs cell reselection or cell switching according to the target offset parameter, to make the number of the sampling points of the cell with the highest network load rate be less than the number of the sampling points of the cell with the lowest network load rate, where the target user equipment is a user equipment which initially accesses to the network of the cells covered by the same network by soft switching, or the target user equipment is a user equipment which is in an operation state and which accesses to the cell with the highest network load rate by soft switching.

Figure 4:
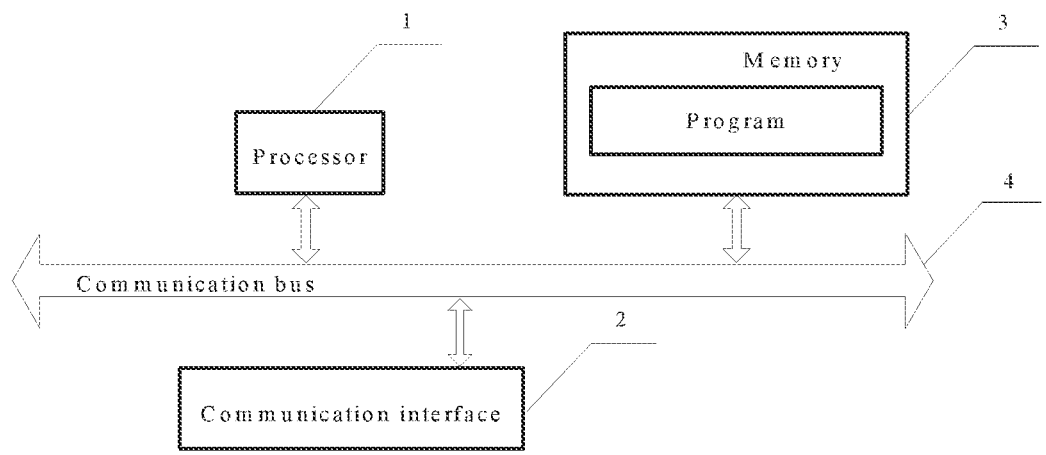
FIG. 4 is a block diagram showing a hardware structure of an apparatus for optimizing unbalanced loads covered by a same network according to an embodiment of the present disclosure.

The device for optimizing unbalanced loads covered by a same network according to the embodiment of the present disclosure may be applied to an apparatus for optimizing unbalanced loads covered by a same network, such as a PC terminal, a cloud platform, a server and a server cluster. In an embodiment, FIG. 4 is a block diagram showing a hardware structure of an apparatus for optimizing unbalanced loads covered by a same network. As shown in FIG. 4, the apparatus for optimizing unbalanced loads covered by a same network may include at least one processor 1, at least one communication interface 2, at least one memory 3 and at least one communication bus 4. In an embodiment of the present disclosure, the number of each of the processor 1, the communication interface 2, the memory 3 and the communication bus 4 is at least one. The processor 1, the communication interface 2 and the memory 3 communicates with each other through the communication bus 4. The processor 1 may be a central processing unit (CPU), an application specific integrated circuit (ASIC), or one or more integrated circuits configured to implement the embodiments of the present disclosure. The memory 3 may include a high-speed RAM, or may further include a non-volatile memory, for example, at least one magnetic disk memory. The memory stores a program. The processor may execute the program stored in the memory, the program is used to: determine whether loads of cells covered by a same network are balanced; determine, if it is determined that the loads of the cells covered by the same network are unbalanced, a cell with a highest network load rate and a cell with a lowest network load rate in the cells covered by the same network; determine a target offset parameter corresponding to a predetermined index according to a timing advance and the number of sampling points of the cell with the highest network load rate and a timing advance and the number of sampling points of the cell with the lowest network load rate, where the predetermined index is an index to which a user equipment refers when selecting a cell; and adjust a load of the cell with the highest network load rate and a load of the cell with the lowest network load rate based on the target offset parameter, to make the number of the sampling points of the cell with the highest network load rate be less than or equal to the number of the sampling points of the cell with the lowest network load rate.

Optionally, the refinement function and the extended function of the program may refer to the above description.

A storage medium is further provided according to an embodiment of the present disclosure. The storage medium may store a program for execution by a processor, the program is used to: determine whether loads of cells covered by a same network are balanced; determine, if it is determined that the loads of the cells covered by the same network are unbalanced, a cell with a highest network load rate and a cell with a lowest network load rate in the cells covered by the same network; determine a target offset parameter corresponding to a predetermined index according to a timing advance and the number of sampling points of the cell with the highest network load rate and a timing advance and the number of sampling points of the cell with the lowest network load rate, where the predetermined index is an index to which a user equipment refers when selecting a cell; and adjust a load of the cell with the highest network load rate and a load of the cell with the lowest network load rate based on the target offset parameter, to make the number of the sampling points of the cell with the highest network load rate be less than or equal to the number of the sampling points of the cell with the lowest network load rate.

Optionally, the refinement function and the extended function of the program may refer to the above description.

Those skilled in the art may appreciate that units and algorithm steps described in combination with the disclosed embodiments may be implemented by electronic hardware, computer software or a combination thereof. Whether to execute the functions by hardware or by software depends on specific applications and design constraint conditions of the technical solution. For each of the specific applications, those skilled in the art may adopt a specific method to implement the functions described above, and the implementation should fall within the scope of the present disclosure.

In the embodiments of the present disclosure, it should be understood that the system, device and method described herein may be implemented in other ways. In addition, the mutual coupling, direct coupling, communication connection shown or discussed may be indirect coupling or communication connection via some interfaces, devices or units, and may be in an electrical form, a mechanical form or other forms.

The units described as separate components may or may not be physically separated. The components shown as units may or may not be physical units, that is, the components may be located in one location, or may be distributed to multiple network units. Some or all of the units may be selected based on actual needs to achieve the object of the technical solutions of the embodiment.

In addition, the functional units in the various embodiments of the present disclosure may be integrated into one processing unit, or each unit may separate physically, or two or more units may be integrated into one unit.

It should be understood that in the embodiments of the present disclosure, dependent claims, various embodiments and features may be combined with each other to solve the above technical problems.

In a case that the function is implemented in a form of a software functional unit and functions as an independent product for sale or use, the function may be stored in a computer readable storage medium. Based on such understandings, the technical solutions or part of the technical solutions disclosed in the present disclosure that makes contributions to the conventional technology or part of the technical solutions may be essentially embodied in the form of a software product. The computer software product is stored in a storage medium. The computer software product includes a number of instructions that allow a computer device (which may be a personal computer, a server, or a network device) to execute all or part of the steps of the method in the embodiments of the present disclosure. The storage medium includes various media which can store program codes, such as a USB disk, a mobile hard disk, a read-only memory (ROM), a random access Memory (RAM), a magnetic disk, or an optical disc.

Based on the above description of the disclosed embodiments, those skilled in the art can implement or carry out the present disclosure. It is apparent for those skilled in the art to make many modifications to these embodiments. The general principle defined herein may be applied to other embodiments without departing from the spirit or scope of the present disclosure. Therefore, the present disclosure is not limited to the embodiments illustrated herein, but should be defined by the widest scope consistent with the principle and novel features disclosed herein.

The invention claimed is:

1. A method for optimizing unbalanced loads covered by a same network, comprising:

determining whether loads of cells covered by a same network are balanced;

determining, if it is determined that the loads of the cells covered by the same network are unbalanced, a cell with a highest network load rate and a cell with a lowest network load rate in the cells covered by the same network;

determining a target offset parameter corresponding to a predetermined index according to a timing advance and the number of sampling points of the cell with the highest network load rate and a timing advance and the number of sampling points of the cell with the lowest network load rate, wherein the predetermined index is an index to which a user equipment refers when selecting a cell; and adjusting a load of the cell with the highest network load rate and a load of the cell with the lowest network load rate based on the target offset parameter, to make the number of the sampling points of the cell with the highest network load rate be less than or equal to the number of the sampling points of the cell with the lowest network load rate, wherein the determining a target offset parameter corresponding to a predetermined index according to a timing advance and the number of sampling points of the cell with the highest network load rate and a timing advance and the number of sampling points of the cell with the lowest network load rate comprises:

determining whether a distribution of the timing advance of the cell with the highest network load rate is similar to a distribution of the timing advance of the cell with the lowest network load rate;

adjusting, if the distribution of the timing advance of the cell with the highest network load rate is not similar to the distribution of the timing advance of the cell with the lowest network load rate, an antenna down-tilt angle of the cell with the lowest network load rate to be the same as an antenna down-tilt angle of the cell with the highest network load rate, and determining the target offset parameter corresponding to the predetermined index; and directly determining, if the distribution of the timing advance of the cell with the highest network load rate is similar to the distribution of the timing advance of the cell with the lowest network load rate, the target offset parameter corresponding to the predetermined index, wherein the determining the target offset parameter corresponding to the predetermined index comprises:

adjusting an initial offset parameter to acquire an intermediate offset parameter, wherein the intermediate offset parameter is a minimum integer capable of making a difference between a value of the predetermined index of the cell with the highest network load rate and the intermediate offset parameter be less than a value of the predetermined index of the cell with the lowest network load rate;

determining, if the value of the predetermined index of the cell with the highest network load rate is reduced by the intermediate offset parameter, whether the number of the sampling points of the cell with the highest network load rate is greater than the number of the sampling points of the cell with the lowest network load rate;

increasing, if it is determined that the number of the sampling points of the cell with the highest network load rate is greater than the number of the sampling points of the cell with the lowest network load rate in a case that the value of the predetermined index of the cell with the highest network load rate is reduced by the intermediate offset parameter, the intermediate offset parameter by a predetermined step and determining the increased intermediate offset parameter as a new intermediate offset parameter, and performing the operation of determining, if the value of the predetermined index of the cell with the highest network load rate is reduced by the intermediate offset parameter, whether the number of the sampling points of the cell with the highest network load rate is greater than the number of the sampling points of the cell with the lowest network load rate; and determining, if it is determined that the number of the sampling points of the cell with the highest network load rate is not greater than the number of the sampling points of the cell with the lowest network load rate in a case that the value of the predetermined index of the cell with the highest network load rate is reduced by the intermediate offset parameter, a newest intermediate offset parameter as the target offset parameter.

2. The method according to claim 1, wherein the determining, if the value of the predetermined index of the cell with the highest network load rate is reduced by the intermediate offset parameter, whether the number of the sampling points of the cell with the highest network load rate is greater than the number of the sampling points of the cell with the lowest network load rate comprises:

acquiring, for each of the sampling points of the cell with the highest network load rate, a difference between the value of the predetermined index of the cell with the highest network load rate corresponding to the sampling point and the intermediate offset parameter, as a candidate index value corresponding to the sampling point;

comparing the candidate index value with the value of the predetermined index of the cell with the lowest network load rate corresponding to the sampling point, to determine a candidate sampling point, wherein the value of the predetermined index of the cell with the lowest network load rate corresponding to the candidate sampling point is greater than the candidate index value;

corn paring a difference Y1 between the number of the sampling points of the cell with the highest load rate and the number of the candidate sampling points with a sum Y2 of the number of the sampling points of the cell with the lowest load rate and the number of the candidate sampling points; and determining, in a case that Y1 is greater than Y2, that if the value of the predetermined index of the cell with the highest network load rate is reduced by the intermediate offset parameter, the number of the sampling points of the cell with the highest network load rate is greater than the number of the sampling points of the cell with the lowest network load rate.

3. The method according to claim 1, wherein the adjusting a load of the cell with the highest network load rate and a load of the cell with the lowest network load rate based on the target offset parameter comprises:

transmitting the target offset parameter to a target user equipment, wherein the target user equipment performs cell reselection or cell switching according to the target offset parameter, to make the number of the sampling points of the cell with the highest network load rate be less than the number of the sampling points of the cell with the lowest network load rate, wherein the target user equipment is a user equipment which initially accesses to the network of the cells covered by the same network by soft switching, or the target user equipment is a user equipment which is in an operation state and which accesses to the cell with the highest network load rate by soft switching.

4. A non-transitory readable storage medium storing a computer program, wherein the computer program, when executed by a processor, causes the processor to perform the method for optimizing unbalanced loads covered by a same network according to claim 1.

5. A device for optimizing unbalanced loads covered by a same network, comprising:

a judgment module, configured to determine whether loads of cells covered by a same network are balanced;

a first determination module, configured to determine, if the judgment module determines that the loads of the cells covered by the same network are unbalanced, a cell with a highest network load rate and a cell with a lowest network load rate in the cells covered by the same network;

a second determination module, configured to determine a target offset parameter corresponding to a predetermined index according to a timing advance and the number of sampling points of the cell with the highest network load rate and a timing advance and the number of sampling points of the cell with the lowest network load rate, wherein the predetermined index is an index to which a user equipment refers when selecting a cell; and an adjustment module, configured to adjust a load of the cell with the highest network load rate and a load of the cell with the lowest network load rate based on the target offset parameter, to make the number of the sampling points of the cell with the highest network load rate be less than the number of the sampling points of the cell with the lowest network load rate, wherein the second determination module comprises:

a judgment unit, configured to determine whether a distribution of the timing advance of the cell with the highest network load rate is similar to a distribution of the timing advance of the cell with the lowest network load rate; and a determination unit, configured to: adjust, if the judgment unit determines that the distribution of the timing advance of the cell with the highest network load rate is not similar to the distribution of the timing advance of the cell with the lowest network load rate, an antenna down-tilt angle of the cell with the lowest network load rate to be the same as an antenna down-tilt angle of the cell with the highest network load rate, and determine the target offset parameter corresponding to the predetermined index; and directly determine, if the judgment unit determines that the distribution of the timing advance of the cell with the highest network load rate is similar to the distribution of the timing advance of the cell with the lowest network load rate, the target offset parameter corresponding to the predetermined index, wherein for determining the target offset parameter corresponding to the predetermined index, the determination unit is configured to:

adjust an initial offset parameter to acquire an intermediate offset parameter, wherein the intermediate offset parameter is a minimum integer capable of making a difference between a value of the predetermined index of the cell with the highest network load rate and the intermediate offset parameter be less than a value of the predetermined index of the cell with the lowest network load rate;

determine, if the value of the predetermined index of the cell with the highest network load rate is reduced by the intermediate offset parameter, whether the number of the sampling points of the cell with the highest network load rate is greater than the number of the sampling points of the cell with the lowest network load rate;

increase, if it is determined that the number of the sampling points of the cell with the highest network load rate is greater than the number of the sampling points of the cell with the lowest network load rate in a case that the value of the predetermined index of the cell with the highest network load rate is reduced by the intermediate offset parameter, the intermediate offset parameter by a predetermined step and determine the increased intermediate offset parameter as a new intermediate offset parameter, and perform the operation of determining, if the value of the predetermined index of the cell with the highest network load rate is reduced by the intermediate offset parameter, whether the number of the sampling points of the cell with the highest network load rate is greater than the number of the sampling points of the cell with the lowest network load rate; and determine, if it is determined that the number of the sampling points of the cell with the highest network load rate is not greater than the number of the sampling points of the cell with the lowest network load rate in a case that the value of the predetermined index of the cell with the highest network load rate is reduced by the intermediate offset parameter, a newest intermediate offset parameter as the target offset parameter.

6. The device according to claim 5, wherein for determining, if the value of the predetermined index of the cell with the highest network load rate is reduced by the intermediate offset parameter, whether the number of the sampling points of the cell with the highest network load rate is greater than the number of the sampling points of the cell with the lowest network load rate, the determination unit is configured to:

acquire, for each of the sampling points of the cell with the highest network load rate, a difference between the value of the predetermined index of the cell with the highest network load rate corresponding to the sampling point and the intermediate offset parameter, as a candidate index value corresponding to the sampling point;

compare the candidate index value with the value of the predetermined index of the cell with the lowest network load rate corresponding to the sampling point, to determine a candidate sampling point, wherein the value of the predetermined index of the cell with the lowest network load rate corresponding to the candidate sampling point is greater than the candidate index value;

compare a difference Y1 between the number of the sampling points of the cell with the highest load rate and the number of the candidate sampling points with a sum Y2 of the number of the sampling points of the cell with the lowest load rate and the number of the candidate sampling points; and determine, in a case that Y1 is greater than Y2, that if the value of the predetermined index of the cell with the highest network load rate is reduced by the intermediate offset parameter, the number of the sampling points of the cell with the highest network load rate is greater than the number of the sampling points of the cell with the lowest network load rate.

7. The device according to claim 5, wherein the adjustment module is configured to:

transmit the target offset parameter to a target user equipment, wherein the target user equipment performs cell reselection or cell switching according to the target offset parameter, to make the number of the sampling points of the cell with the highest network load rate be less than the number of the sampling points of the cell with the lowest network load rate, wherein the target user equipment is a user equipment which initially accesses to the network of the cells covered by the same network by soft switching, or the target user equipment is a user equipment which is in an operation state and which accesses to the cell with the highest network load rate by soft switching.

8. An apparatus for optimizing unbalanced loads covered by a same network, comprising:

a memory configured to store a program; and a processor configured to execute the program to perform a method for optimizing unbalanced loads covered by a same network, the method comprising:

determining whether loads of cells covered by a same network are balanced;

determining, if it is determined that the loads of the cells covered by the same network are unbalanced, a cell with a highest network load rate and a cell with a lowest network load rate in the cells covered by the same network;

determining a target offset parameter corresponding to a predetermined index according to a timing advance and the number of sampling points of the cell with the highest network load rate and a timing advance and the number of sampling points of the cell with the lowest network load rate, wherein the predetermined index is an index to which a user equipment refers when selecting a cell; and adjusting a load of the cell with the highest network load rate and a load of the cell with the lowest network load rate based on the target offset parameter, to make the number of the sampling points of the cell with the highest network load rate be less than or equal to the number of the sampling points of the cell with the lowest network load rate, wherein the determining a target offset parameter corresponding to a predetermined index according to a timing advance and the number of sampling points of the cell with the highest network load rate and a timing advance and the number of sampling points of the cell with the lowest network load rate comprises:

determining whether a distribution of the timing advance of the cell with the highest network load rate is similar to a distribution of the timing advance of the cell with the lowest network load rate;

adjusting, if the distribution of the timing advance of the cell with the highest network load rate is not similar to the distribution of the timing advance of the cell with the lowest network load rate, an antenna down-tilt angle of the cell with the lowest network load rate to be the same as an antenna down-tilt angle of the cell with the highest network load rate, and determining the target offset parameter corresponding to the predetermined index; and directly determining, if the distribution of the timing advance of the cell with the highest network load rate is similar to the distribution of the timing advance of the cell with the lowest network load rate, the target offset parameter corresponding to the predetermined index, wherein the determining the target offset parameter corresponding to the predetermined index comprises:

adjusting an initial offset parameter to acquire an intermediate offset parameter, wherein the intermediate offset parameter is a minimum integer capable of making a difference between a value of the predetermined index of the cell with the highest network load rate and the intermediate offset parameter be less than a value of the predetermined index of the cell with the lowest network load rate;

determining, if the value of the predetermined index of the cell with the highest network load rate is reduced by the intermediate offset parameter, whether the number of the sampling points of the cell with the highest network load rate is greater than the number of the sampling points of the cell with the lowest network load rate;

increasing, if it is determined that the number of the sampling points of the cell with the highest network load rate is greater than the number of the sampling points of the cell with the lowest network load rate in a case that the value of the predetermined index of the cell with the highest network load rate is reduced by the intermediate offset parameter, the intermediate offset parameter by a predetermined step and determining the increased intermediate offset parameter as a new intermediate offset parameter, and performing the operation of determining, if the value of the predetermined index of the cell with the highest network load rate is reduced by the intermediate offset parameter, whether the number of the sampling points of the cell with the highest network load rate is greater than the number of the sampling points of the cell with the lowest network load rate; and determining, if it is determined that the number of the sampling points of the cell with the highest network load rate is not greater than the number of the sampling points of the cell with the lowest network load rate in a case that the value of the predetermined index of the cell with the highest network load rate is reduced by the intermediate offset parameter, a newest intermediate offset parameter as the target offset parameter.

* * * * *